United States Patent
Davies

(10) Patent No.: US 6,587,215 B2
(45) Date of Patent: Jul. 1, 2003

(54) LOW SIGNAL-TO-NOISE RATIO BRANCH-POINT-CAPABLE ADAPTIVE OPTICS SENSOR

(75) Inventor: Donald W. Davies, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 92 days.

(21) Appl. No.: 09/974,432

(22) Filed: Oct. 9, 2001

(65) Prior Publication Data

US 2003/0067610 A1 Apr. 10, 2003

(51) Int. Cl.$^7$ .................................................. C03R 9/02
(52) U.S. Cl. ........................................ 356/520; 356/512
(58) Field of Search ................................ 356/520, 511, 356/512, FOR 108

(56) References Cited

U.S. PATENT DOCUMENTS 6,163,381 A    12/2000  Davies et al.
6,249,352 B1 * 6/2001  Davies et al. ............... 356/520

* cited by examiner

*Primary Examiner*—Samuel A. Turner
*Assistant Examiner*—Patrick Connolly
(74) *Attorney, Agent, or Firm*—Harness, Dickey & Pierce, P.L.C.

(57) ABSTRACT

A lateral shearing interferometer wavefront sensor system (10) that employs a double-shear/full aperture approach to correct for branch points in the wavefront of an optical beam (24) that has been aberated. The wavefront sensor system (10) includes a lateral shearing interferometer (12) having a beam splitter (14) that splits the beam (24) into a first split beam (28) and a second split beam (26), a beam shifter (22) that shifts the first split beam (28) relative to the second split beam (26), and a beam combiner (16) that combines first shifted split beam (28) and the second split beam (26) into a combined beam (30). The combined beam (30) provides an interference pattern that includes a plurality of interfered beam portions (76, 78, 82, 84). A deformable mirror (72) includes a plurality of actuators (74) which deform the mirror (72) to correct the beam wavefront. The interfered portions (76, 78, 82, 84) are twice the distance apart between actuators (74), or a double shear such that interfering portions (76, 78, 82, 84) do not align with branch cuts between the actuators (74).

18 Claims, 2 Drawing Sheets

LOW SIGNAL-TO-NOISE RATIO BRANCH-POINT-CAPABLE ADAPTIVE OPTICS SENSOR

BACKGROUND OF THE INVENTION

1. Field of the Invention

This invention relates generally to an optical system for correcting wavefront phase aberrations of a light beam and, more particularly, to a lateral shearing interferometer wavefront sensor and associated optical system that employs a double-shear/full-aperture approach to correct for branch points in the wavefront of an optical beam that has been subjected to aberrations.

2. Discussion of the Related Art

Certain types of optical transmission systems, such as optical communications systems, imaging systems, etc., transmit a coherent light beam carrying information through a medium, such as air. Because the light beam is coherent, the phase of the beam is substantially constant across the beam wavefront when it is generated. However, conditions in the medium, such as turbulence in the air, typically corrupts the beam by introducing distortions that cause some portions of the wavefront to have a different phase than other portions of the wavefront at any given instant in time. If this wavefront phase aberration was not corrected at the receiver, the light beam could not be effectively focused onto receiving optics, such as a fiber optic cable, and thus a significant intensity of the beam could be lost. Therefore, it is known in the art to correct wavefront aberrations at the receiver of an optical system of this type.

Different systems are known in the art to correct wavefront aberrations in an optical system of the type being discussed herein. Typically, these types of systems employ a wavefront sensor, such as a Hartmann sensor, that measures the phase of individual portions of the beam wavefront. Hartmann sensors typically employ an array of lenslets for dividing the wavefront into a matrix of subapertures. Each of the beams in the subapertures is focused by the lenslets onto one or more detectors forming an array of spots on the detectors. The position of the spots provides a direct indication of the wavefront tilt for each subaperture. These tilts are then used by a wavefront reconstructor to generate a surface representative of the phase relationship of the measured beam wavefront. A deformable mirror is employed to generate a compliment of the surface generated by the reconstructor. The aberated light beam is reflected off of the mirror that provides a corrected beam substantially free of wavefront phase aberations. The deformable mirror typically includes an array of actuators positioned behind the mirror that act to deform the mirror at the desired locations to provide the compliment of the sensed wavefront to correct the phase. This process is performed many times a second depending on the particular application.

In another known system, a lateral shearing interferometer (LSI) wavefront sensor is used in combination with the wavefront reconstructor and deformable mirror to provide branch point corrections in the wavefront of the optical beam. A branch point is a point in the wavefront where the phase has a screw-like dislocation. In order to correct a wavefront with branch points, one-wave steps must be made in the surface of the deformable mirror, referred to as branch cuts. One known example of an LSI wavefront sensor is discussed in U.S. Pat. No. 6,163,381, titled Dual Sensor Atmospheric Correction System, assigned to the assignee of this application and herein incorporated by reference.

LSI wavefront sensors provide a copy of the beam being corrected that is shifted in the x-direction by a distance equal to the spacing between actuators on the deformable mirror. The original beam and the shifted beam are combined to provide an interference pattern depicting the phase difference therebetween. The combined beam is then applied to an array of detectors to measure the interference pattern. The intensity of the light measured by the detectors provides a measure of the tilt of the wavefront in the x-direction, and thus the relative phase relationship of the original beam. The same process is also provided to measure the tilt of the beam wavefront in the y-direction.

An example of an LSI wavefront sensor 10 is shown by schematic diagram in FIG. 1. The LSI wavefront sensor 10 employs a Mach-Zehnder LSI 12 including an input beam splitter 14, an output beam combiner 16, two plane reflectors 18 and 20 and a beam shifter 22. An incident beam 24 is split by the beam splitter 14 into first and second split beams 26 and 28 that propagate along separate beam paths, where the two beam paths are equal in length, and are then combined by the beam combiner 16. The split beam 28 propagates through the beam shifter 22, and is shifted thereby. Therefore, when the first and second beams 26 and 28 reach the beam combiner 16, they are offset relative to each other a predetermined distance as set by the beam shifter 22. The beams 26 and 28 are combined as output beam 30, and the interference pattern created by the combination of the beams 26 and 28 is sensed by a detector 32.

The LSI wavefront sensor 10 is able to determine the tilt in the wavefront of the input beam 24 in this manner. The amount of shift of the beam 28 is typically set as the distance between the actuators on the deformable mirror, and is referred to as a "unit shear". In other words, the distance that the split beam 28 is shifted defines areas in the beam 28 that are one actuator apart as compared to the same area in the beam 26. The adjacent portions of the beams 26 and 28 that are interfered with in the combined beam 30 provide a measure of the phase difference between the interfered portions. The detector 32 detects the phase difference between the beam portions because bright areas in the combined beam 30 are constructive interference areas of the beams 26 and 28 that are in-phase, and dark areas in the combined beam 30 are destructive interference areas of the beams 26 and 28 that are out-of-phase. The LSI wavefront sensor 10 provides lateral shearing in one of either the x-direction or the y-direction. A second LSI wavefront sensor is employed for the other direction. The detected signal by the detector 32 is sent to a wavefront reconstructor that then controls the actuators on the deformable mirror, as discussed above.

Two different unit-shear approaches are known to operate an LSI wavefront sensor in this type of system. These approaches include a unit-shear/full aperture approach and a unit-shear/partial aperture approach. As will be discussed in more detail below, when signal levels are high, the partial aperture configuration works the best, as suggested in U.S. patent application Ser. No. 09/410,011, filed Sep. 30, 1999, titled Improved Lateral Shearing Interferometer System, also assigned to the assignee of this application and herein incorporated by reference. However, because the masking of the beams required by the partial aperture approach decreases the available signal, this approach fails at low optical signal levels where the full aperture approach is still working, although at reduced performance.

FIG. 2 is a one-dimensional schematic diagram showing the problem identified above. This diagram shows a surface 40 of a deformable mirror including a first surface portion 42 and a second surface portion 44, where the surface portions 42 and 44 are about one wavelength of the beam 24 apart and are connected by a sloped portion 46. The sloped portion 46 represents a branch cut. An actuator 52 is shown positioned adjacent the surface portion 44, and an actuator 54 is shown positioned adjacent to the surface portion 42. The actuators 52 and 54 push up on the surface portions 42 and 44, respectively, in response to a control signal to generate a compliment of the wavefront surface as calculated by the wavefront reconstructor. The maximum distance the surface portions 42 and 44 can be apart is the one wavelength of the beam 24. As would be appreciated by those skilled in the art, the deformable mirror would include many actuators positioned relative to many branch cuts on the deformable mirror to correct the complete wavefront in this manner.

As discussed above, the first and second split beams 26 and 28 are spatially offset from one another when they are interfered with. This spatial offset is determined by the distance between the actuators on the deformable mirror, where the wavefront of each beam 26 and 28 can be defined as a combination of separate portions between the actuators. For the unit-shear/full aperture approach, FIG. 2 shows a beam area 60 representative of a portion of the first beam 26, and a beam area 62 representative of a portion of the second beam 28. The beam areas 60 and 62 are portions in the beams 26 and 28 that are aligned and interfered with by the combiner 16. In other words, the beam areas 60 and 62 are the same area in the combined beam 30 that were adjacent to each other by the shifted distance in the first and second beams 26 and 28. When the beams 26 and 28 are combined, the beam areas 60 and 62 will align in a one-to-one relationship.

As is apparent, the beam areas 60 and 62 are contiguous with each other and are positioned so that part of the beam areas 60 and 62 are over the sloped portion 46 between the actuators 52 and 54, as shown. Each beam area 60 and 62 has a dimension (unit shear) in both the x and y direction that is the distance between actuators. This causes the beam areas 60 and 62 to contact each other. The full wavefront of the beams 26 and 28 would include many such beam areas relative to the actuators on the deformable mirror in this manner. This diagram only shows one beam area for each of the beams 26 and 28 to simplify the discussion. Because parts of the beam areas 60 and 62 align with the branch cut or the sloped portion 46, the difference in the relative phase over the complete areas 60 and 62 limits the beam reconstruction performance. In other words, when the areas 60 and 62 are interfered, the result is not the desired result, perfect constructive interference, because of the intermediate areas interfering between the zero, or one-wave, areas. This produces a bogus tilt in the wavefront sensor, which causes the wavefront reconstructor to change the surface away from what it should be, resulting in instability and poor performance.

In order to overcome these limitations in the unit-shear/full aperture approach, it has been suggested in the '011 application that better wavefront sensor performance can be achieved by limiting the size of the areas 60 and 62. Particularly, in the unit-shear/partial aperture approach, the beams 26 and 28 are masked by the LSI 12 so that only those beam portions directly above the actuators 52 and 54 are interfered. FIG. 2 also shows a beam area 64 of the beam 26 and a beam area 66 of the beam 28 that are those portions of the beams 26 and 28 that are directly interfered with when the beams 26 and 28 are combined. The size of the areas 60 and 62 is reduced to form the areas 64 and 66 so that the areas 64 and 66 are not contiguous. The shear distance is still, however, a unit shear. Because the unmasked beam portions defining the areas 64 and 66 are directly aligned with the actuators 52 and 54, these portions do not extend over the branch cut, the sloped portion 46, and do not suffer from the performance limitations discussed herein.

The unit-shear/partial aperture approach corrects the problem with unit-shear/full aperture approach by blocking the light that is not directly on top of the actuators. This improves the performance dramatically, and is the best solution if there is adequate signal. There are situations, however, where the optical signal level is too low so that the unit-shear/partial aperture approach does not have enough light to operate properly. In other words, because a significant portion of the beams 26 and 28 is masked in this approach, in those cases where the total light is already limited, further reducing the amount of light significantly limits the performance of the receiver.

What is needed is an LSI wavefront sensor that has the advantages of the unit-shear/partial aperture approach, but does not suffer from poor performance at low signal levels. It is therefore an object of the present invention to provide such an LSI wavefront sensor.

SUMMARY OF THE INVENTION

In accordance with the teachings of the present invention, a lateral shearing interferometer wavefront sensor system is disclosed that employs a double-shear/full aperture approach to correct for branch points in the wavefront of an optical beam that has been aberrated. The wavefront sensor system includes a lateral shearing interferometer having a beam splitter that splits the optical beam into a first split beam and a second split beam, a beam shifter that shifts the first split beam relative to the second split beam, and a beam combiner that combines the first and second split beams into a combined beam. The interference pattern generated by the combined beam is detected by a detector, where beam portions of the first and second split beams are defined in the interference pattern. A wavefront reconstructor receives signals from the detector and reconstructs the beam wavefront. A deformable mirror is provided having a plurality of actuators, where the actuators deform the mirror to correct the beam wavefront.

The interfered beam portions are a double shear in distance apart, or twice the distance between actuators. In this manner, interfering portions of the split beams do not align with branch cuts between the actuators. The interfering portions of the split beams are defined relative to the actuators such that one set of opposing edges of the beam portions align with adjacent actuators, and the other set of opposing edges of the beam portions are positioned between adjacent actuators. The opposing edges of the beam portions between the actuators is in the shear direction.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

DETAILED DESCRIPTION OF THE PREFERRED EMBODIMENTS

The following discussion of the preferred embodiments directed to a double-shear/full aperture LSI wavefront sensor is merely exemplary in nature and is in no way intended to limit the invention or its applications or uses.

The LSI wavefront sensor proposed herein operates with the full signal level of the unit-shear/full aperture approach, discussed above, without suffering as much performance degradation as the unit-shear/partial aperture approach at low signal levels. It accomplishes this by operating with two units of lateral shear instead of one, with interdigitated measurements. This makes the critical measurement at the branch cut immune to the mirror surface shape between actuators on the deformable mirror. This is where the errors occurred on the unit-shear/full aperture LSI wavefront sensor, and why the unit-shear/partial aperture configuration worked better (the part of the aperture used was over the actuators, not on the slope between actuators). By going to a two-unit (double) shear, both areas involved in the shear at a branch cut are on the flat area of the deformable mirror.

The next position over in the array of shear measurements does have some corruption due to the branch cut, but because the measurements are divided by the amount of shear the error is reduced, and because the rapidly varying shear in that area reduces the fringe contrast, the complex reconstructor weights these measurements lower. The end result is that the performance of the system with two units of shear is considerably better than the unit-shear/full aperture approach.

Figure 2:
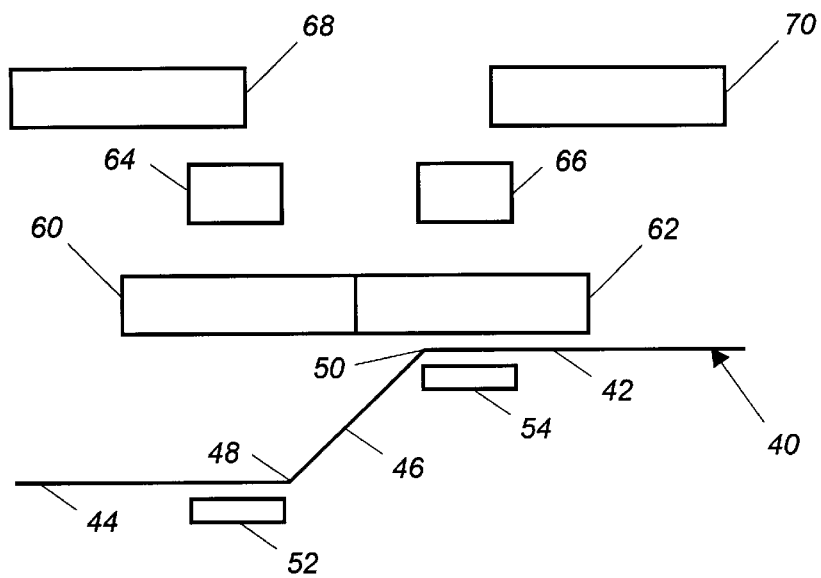
FIG. 2 is a schematic representation of interfering beam portions relative to a deformable mirror in an LSI wavefront sensor for a unit-shear/full aperture configuration, a unit-shear/partial aperture configuration and double-shear/full aperture configuration, where the double-shear/full aperture approach depicts the present invention.

FIG. 2 also shows how the double-shear/full aperture configuration approach of the invention addresses the problem discussed above. In this figure, beam area 68 is the portion of the beam 26 that is interfered with a beam area 70 of the beam 28 in the same manner as the beam areas 64 and 66 and beam areas 60 and 62. As is apparent, the beam areas 68 and 70 are the same size as the beam areas 60 and 62 in the unit-shear/full aperture approach, but are spaced two actuator distances apart. This distance is a double-shear distance, twice the shear distance as the areas 60 and 62, giving the two actuator space therebetween. Because the areas 60, 62, 68 and 70 are the same size, the double-shear/full aperture approach uses the same amount of signal as the unit-shear/full aperture approach. The alignment of the areas 68 and 70 relative to the surface 40 is such that no part of the areas 68 and 70 are over the sloped portion 46. Consequently, when the beam areas 68 and 70 are interfered in the combined beam 30, the interference pattern is a true representation of the distance between the surface portions 42 and 44 that is not affected by the sloped portion 46. Further, because the amount of light used is more than the unit-shear/partial aperture approach, the double-shear/full aperture approach of the invention does not suffer the limitations of low signal for this approach.

At the cut (sloped portion 46), the double-shear/full aperture configuration correctly measures perfect constructive interference and the complex reconstructor leaves it alone. The next shear positions to the left and right of the beam areas 68 and 70 interfere with the edge of the cut with a flat surface, producing a signal with very little contrast. Further, since the shear is two units, the measurement tilt gets reduced by a factor of two. Combined with the constraints imposed by the complex reconstructor (there are generally about twice as many tilt measurements as degrees of freedom from the actuator positions and the reconstructor weights measurements by their contrast), the resulting performance of the system is improved.

Figure 1:
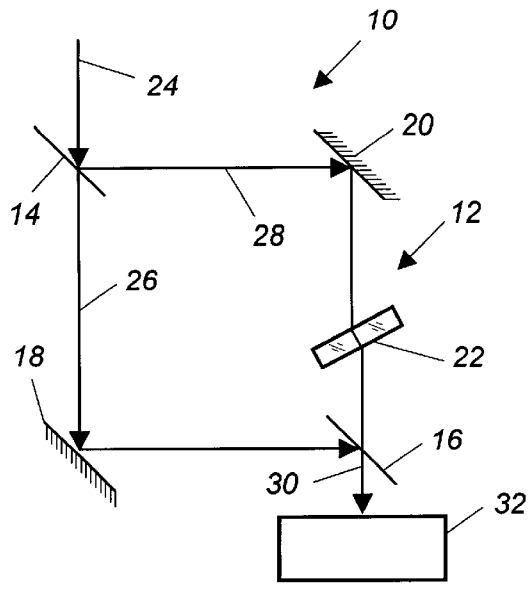
FIG. 1 is a schematic diagram of a lateral shear interferometer wavefront sensor.
Figure 3:
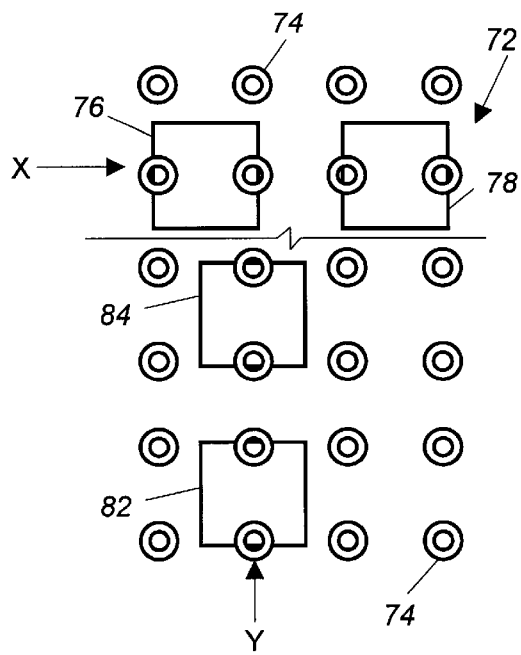
FIG. 3 shows a two-dimensional representation of the position of x-direction and y-direction beam interfering portions relative to the actuators on a deformable mirror, according to the present invention.

FIG. 3 shows a surface portion of a deformable mirror 72, including an array of actuators 74, that depicts the relationship between the areas interfering and the actuators for both the x and y shear measurements. In the x-direction, a beam portion 76 represents the beam area 68 and a beam portion 78 represents the beam area 70. The beam portions 76 and 78 are two actuator distances apart (two units of shear), where one set of opposing edges of the portions 76 and 78 cut across the actuators 74 (vertical line in FIG. 3), and the other set of opposing edges of the portions 76 and 78 are between adjacent actuators 74 (horizontal line in FIG. 3). The opposing edges between the actuators 74 are in the direction of the shear, here the x-direction. The distance of the double-shear discussed herein is twice the distance between adjacent actuators. The beam portions 76 and 78 are defined relative to the pixels of the detector 32.

In the y-direction portion of the mirror 72, beam portions 82 and 84 represent the beam areas 68 and 70, respectively, in this direction. The beam portions 82 and 84 are also shown configured in the same manner as the beam portions 76 and 78, however, their relative alignment is opposite to that of the beam portions 76 and 78 for the y-direction. In other words, the opposing edges of the beam portions 76 and 78 between the actuators 74 are in the y-direction.

Figure 4:
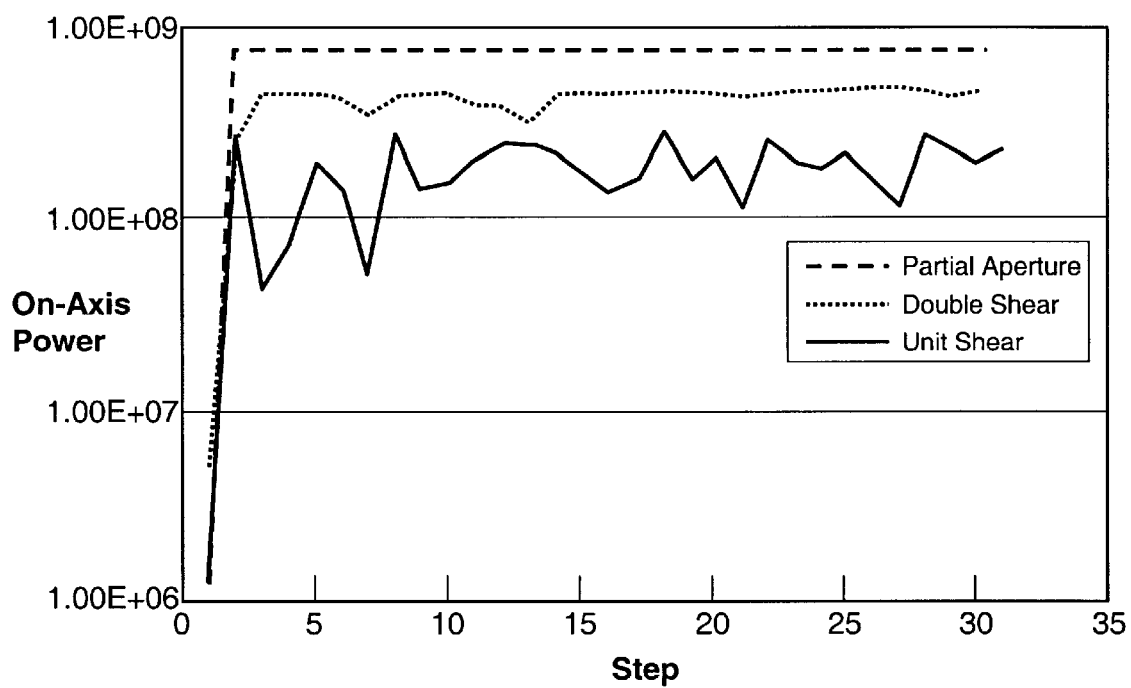
FIG. 4 is a graph with steps on the horizontal axis and on-axis power on the vertical axis depicting the relative performance between an LSI wavefront sensor employing a unit-shear/full aperture approach, a unit-shear/partial aperture approach and a double-shear/full aperture approach at high signal intensity.
Figure 5:
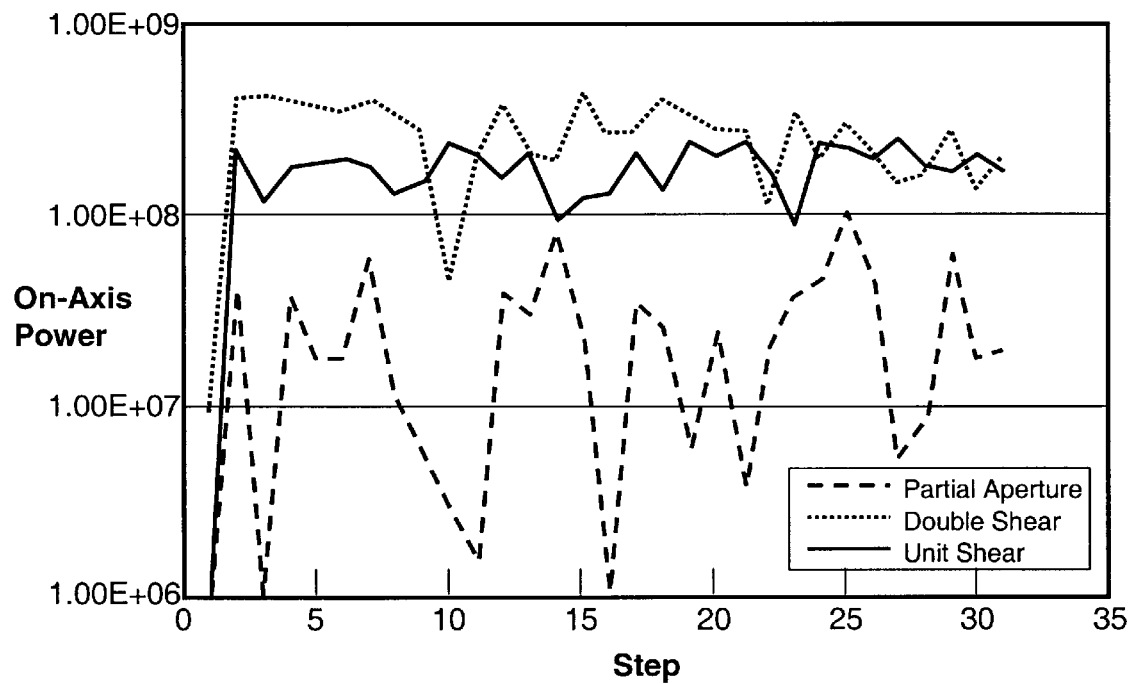
FIG. 5 is a graph with steps on the horizontal axis and on-axis power on the vertical axis showing the relative performance between an LSI wavefront sensor employing a unit-shear/full aperture approach, a unit-shear/partial aperture approach, and a double-shear/full aperture approach at low signal intensity.

FIGS. 4 and 5 are graphs that depict the performance of the unit-shear/full aperture, unit-shear/partial aperture and double-shear/full aperture approaches, discussed above, where on-axis power is shown on the vertical axis and time is shown in the horizontal axis. In FIG. 4, the beam intensity is high, and performance of the partial aperture approach would be the best. As is apparent, the unit-shear/full aperture approach is relatively unstable because the system continually tries to correct for those parts of the beam areas 60 and 62 above the sloped portion 46. Because these portions are not one-wave apart, they tend to correct in the wrong direction. Where the benefits of the present invention are noticed, are in low signal-to-noise situations, as shown in FIG. 5, where the light intensity is low. In this depiction, it is shown that the double-shear/full aperture approach of the present invention provides the best performance.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A lateral shearing interferometer wavefront sensor system for correcting phase discrepancies in an optical beam wavefront, said system comprising:

a lateral shearing interferometer responsive to an input optical beam to be corrected, said interferometer including a beam splitter that splits the optical beam into a first split beam and a second split beam, said interferometer further including a beam shifter responsive to the first split beam that shifts the position of the first split beam in a shear direction relative to the second split beam, said interferometer further including a beam combiner combining the first and second split beams into a combined beam, said combined beam creating an interference pattern between the first and second split beams; and a deformable mirror including a plurality of actuators, said beam shifter shifting the first beam relative to the second beam twice the distance between a first actuator and a second actuator.

2. The system according to claim 1 wherein the first and second split beams includes a plurality of beam portions where each beam portion of the first split beam is interfered beam with a corresponding beam portion of the second split beam, and wherein the interfering portions of the first and second split beams are two unit-shear in distance apart.

3. The system according to claim 2 wherein the beam portions of the first and second split beams are aligned with the actuators so that a first set of opposing edges of the beam portions are aligned with adjacent actuators and a second set of opposing edges of the beam portions are aligned between adjacent actuators.

4. The system according to claim 3 wherein the set of opposing edges of the beam portions between adjacent actuators are aligned in the direction of the shear.

5. The system according to claim 3 wherein the plurality of beam portions have a square shape.

6. The system according to claim 1 further comprising a detector, said detector being responsive to the combined beam and generating signals indicative of the interference pattern between the first and second split beams.

7. A lateral shearing interferometer wavefront sensor system for correcting phase differences in an optical beam wavefront, said system comprising a lateral shearing interferometer responsive to an input optical beam to be corrected, said interferometer including a beam splitter, a beam shifter and a beam combiner, said beam splitter splitting the input optical beam into a first split beam and a second split beam, said beam shifter being responsive to the first split beam and shifting the first split beam a predetermined shear distance in a shear direction relative to the second split beam, said beam combiner combining the first shifted split beam and the second split beam into a combined beam, wherein the first and second split beams include a plurality of beam portions where each beam portion of the first shifted split beam is interfered with a corresponding beam portion of the second split beam, wherein the interfering beam portions of the first shifted split beam and the second split beam are more than a unit-shear in distance apart.

8. The system according to claim 7 wherein the beam shifter shifts the first split beam relative to the second split beam a two unit-shear distance.

9. The system according to claim 7 further comprising a deformable mirror including a plurality of actuators, said beam shifter shifting the first split beam relative to the second beam double the distance between adjacent actuators.

10. The system according to claim 7 wherein the beam portions of the first shifted split beam and the second split beam are aligned with the actuators so that a first set of opposing edges of the beam portions are aligned with adjacent actuators and a second set of opposing edges of the beam portions are aligned between adjacent actuators.

11. The system according to claim 10 wherein the set of opposing edges of the beam portions between adjacent actuators are aligned in the direction of the shear.

12. The system according to claim 7 wherein the plurality of beam portions have a square shape.

13. The system according to claim 7 further comprising a detector, said detector being responsive to the combined beam and generating signals indicative of the interference pattern between the first and second split beams.

14. A method of correcting phase differences in a wavefront of an optical beam, said method comprising the steps of:

directing the optical beam into a beam splitter that splits the optical beam into a first split beam and a second split beam;

shifting the first split beam in a shear direction relative to the second split beam, said first split beam being shifted more than a unit-shear distance;

combining the first shifted split beam and the second split beam into a combined beam to create an interference pattern between the first shifted split beam and the second split beam;

detecting the interference pattern of the combined beam;

reconstructing the optical beam wavefront from the interference pattern;

creating a compliment of the reconstructed beam wavefront by selectively controlling the surface of a deformable mirror; and directing the optical input beam off of the deformable mirror.

15. The method according to claim 14 wherein the step of shifting the first split beam in a shear direction includes shifting the first split beam a double-shear distance.

16. The method according to claim 14 wherein the step of shifting the first split beam includes shifting the first split beam a two unit-shear distance, where a unit-shear distance is the distance between actuators on the deformable mirror.

17. The method according to claim 14 wherein the step of combining the first shifted split beam and the second split beam includes interfering corresponding beam portions of the first shifted split beam and the second split beam where the interfering portions of the first shifted split beam and the second split beam are a two unit-shear in distance apart.

18. The method according to claim 17 wherein opposing edges of the beam portions are positioned between adjacent actuators that control the surface of the deformable mirror in the direction of the shear.

* * * * *